UNITED STATES PATENT OFFICE

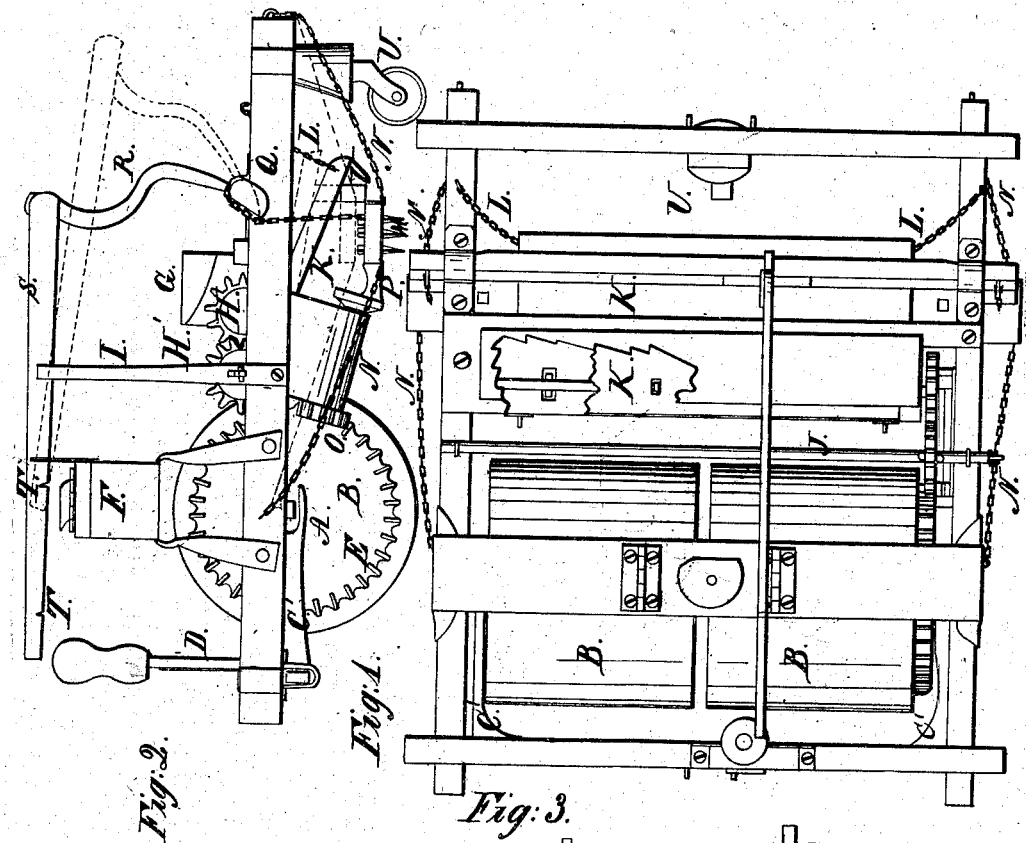
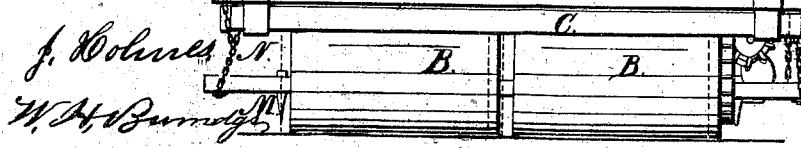

W. H. HARTMAN, OF FOSTORIA, OHIO.

COMBINED SEEDING-MACHINE, ROLLER, AND DRAG.

Specification forming part of Letters Patent No. 48,063, dated June 6, 1865.

*To all whom it may concern:*

Be it known that I, W. H. HARTMAN, of Fostoria, in the county of Seneca and State of Ohio, have invented new and useful Improvements in Combined Seeding-Machine, Roller, and Drag, (the same being an improvement on a patent granted to me January 10, 1865;) and I do hereby declare that the following is a full and complete description of the construction and operation of the same, reference being had to the accompanying drawings, making part of this specification, in which—

Figure 1 is a top view. Fig. 2 is a side view, and Fig. 3 is a rear end view.

The frame is of a rectangular form, to the under side of which is secured a shaft, A, upon which the rollers B freely revolve. The rollers are capable of an endwise adjustment for the purpose of being thrown out of and into gear with the feeding-wheels, as hereinafter set forth. This endwise adjustment is effected by means of the adjusting-bar C and arms C', which are operated by the lever D, the space between the arms C' being just sufficient to admit both the rollers B. One end of one of the rollers is provided with cog-gear E.

F is a box mounted over the rollers, which serves both for the driver's seat and for weighting the rollers.

G is the seed-box, in the bottom of which is placed a feed-roller with the usual openings for the seed to pass through. A cog-wheel, H, is secured to one end of the feed-roller, and connected with the driving-gear E by means of an intermediate wheel, H'. This intermediate wheel can be thrown into or out of gear by means of the lever I, which is pivoted to the end of the shaft J, to which the wheel H' is attached.

K represents a seed-distributing board or apron, which extends from beneath the seed-box nearly to the front end of the frame in an inclined position, as shown in Fig. 2, to a point forward of the drag, hereinafter described, and is supported by chains or cords L, attached to the frame.

M is a drag, which extends across underneath the frame and distributing-board K. This is supported at each end by chains N, extending therefrom, both forward and backward, to the frame. These chains are sufficiently pendent to allow a free oscillating movement of the drag transversely to the direction in which the machine moves. An oscillating motion is communicated to the drag by means of a pinion, O, which gears into the wheel E on the end of the roller B, and a crank and connecting-rod P. The drag M can be raised from the ground by means of a flat bar, Q, pivoted at one edge, arm R, and lever S, and retained in its elevated position by securing the lever in notches T, as indicated by the dotted lines in Fig. 2.

The forward end of the frame of the machine is supported upon the caster-wheel U, while the other parts rest upon the rollers B B. The oscillating of the drag can be arrested by changing the position of the roller B by means of the lever D.

On the forward edge of the drag I place a long box, V, equal in length to the width of the machine, having a perforated bottom for the purpose of sowing grass-seed or other small seeds, or for distributing fertilizers.

What I claim as my improvement, and desire to secure by Letters Patent, is—

1. The oscillating drag M, provided with a seed-box, V, as and for the purpose specified.

2. The distributing-board K, in combination with the seed-box G and rollers B, when arranged and operating as and for the purpose set forth.

3. The adjustment of the roller B in its relation to the drag M, as and for the purpose described.

W. H. HARTMAN.

Witnesses:
W. H. BURRIDGE,
A. W. McCLELLAND.